(No Model.) 2 Sheets—Sheet 2.
H. W. THURSTON & E. STENERSEN.
BICYCLE.
No. 483,661. Patented Oct. 4, 1892.
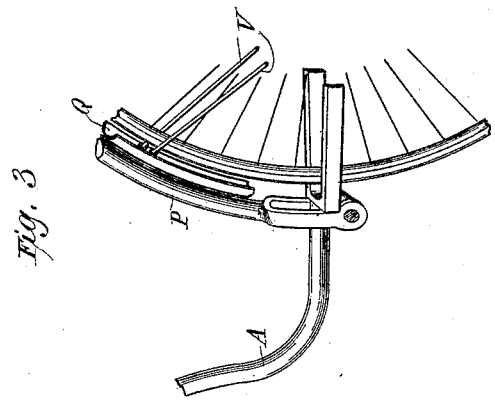
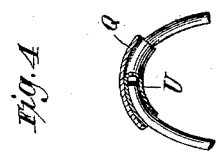
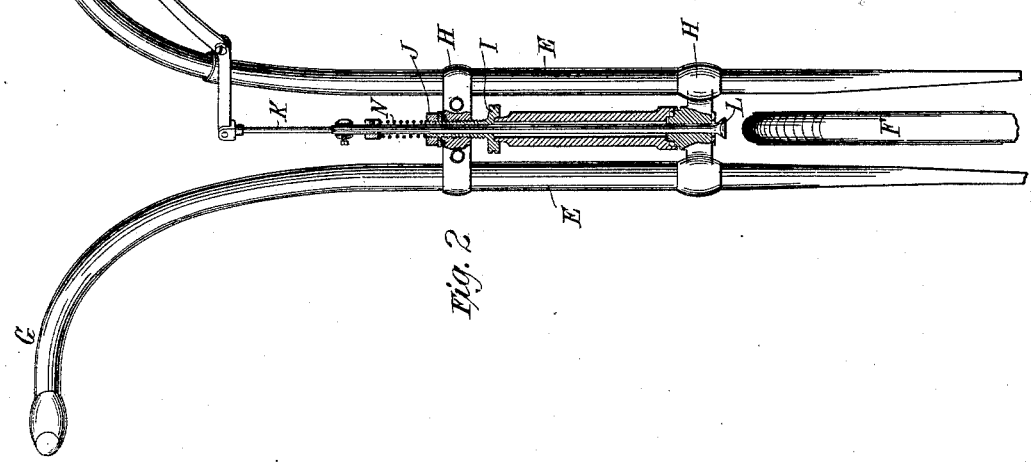
Witnesses:
Raphaïl Netter
Ernest Hopkinson
Inventors
Henry W. Thurston
& Erik Stenersen
by Duncan & Page
Attorneys

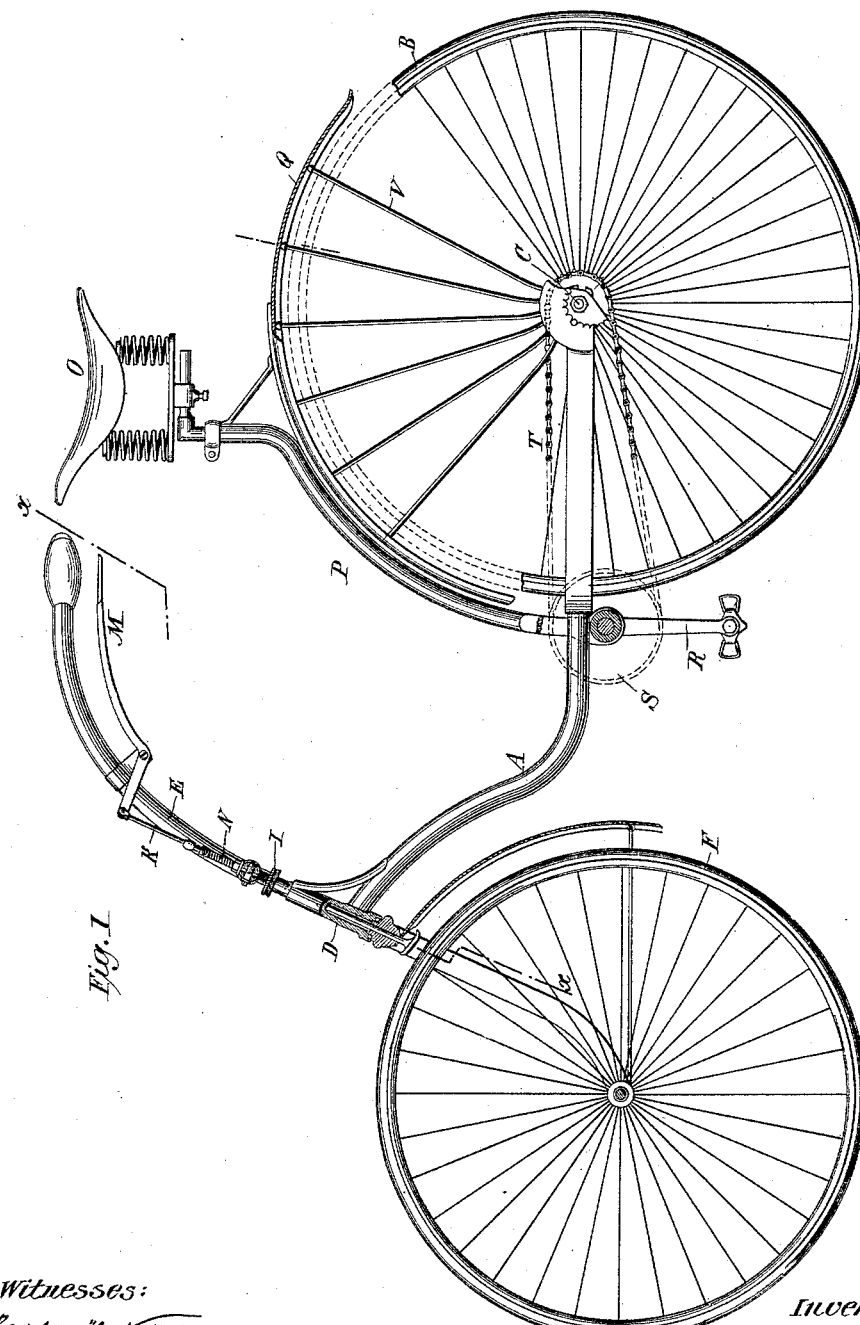

UNITED STATES PATENT OFFICE.

HENRY W. THURSTON, OF WOODSIDE, NEW YORK, AND ERIK STENERSEN, OF ROCKAWAY, NEW JERSEY, ASSIGNORS OF ONE-THIRD TO GEORGE R. BARNS, OF BROOKLYN, NEW YORK.

BICYCLE.

SPECIFICATION forming part of Letters Patent No. 483,661, dated October 4, 1892.

Application filed November 20, 1891. Serial No. 412,484. (No model.)

*To all whom it may concern:*

Be it known that we, HENRY W. THURSTON, a citizen of the United States, residing at Woodside, in the county of Queens and State of New York, and ERIK STENERSEN, a subject of the King of Sweden and Norway, residing at Rockaway, in the county of Morris and State of New Jersey, have invented certain new and useful Improvements in Bicycles, of which the following is a specification, reference being had to the drawings accompanying and forming a part of the same.

This invention is an improvement in Safety bicycles or other machines of similar character; and it consists in an improved construction of the frame whereby greater strength and durability are secured and the weight of the rider supported on a spring or springs forming part of said frame, which in their action in compensating for unevenness in the road traveled are much more perfect than the other devices of a similar nature heretofore designed or applied for this purpose.

The particular construction in which our invention resides is the combination, with the main frame and rigid parts in which both front and rear axles are journaled, of a frame that carries the saddle and pedal shaft and which is connected with the main frame by a series of light spring-bars secured in plates forming part of the main frame on opposite sides of the rear wheel and which radiate therefrom upward and in a forward direction, so that the movement of the saddle and the position of the frame to which it is connected will be through an arc of limited extent and substantially concentric with the rear wheel, as distinguished from a vertical or bodily movement toward and from its center.

Figure 1 is a view, mainly in side elevation, of the machine complete. Fig. 2 is a sectional view on line *x x* of Fig. 1. Fig. 3 is a perspective view of a portion of the frame. Fig. 4 is a sectional view of a detail in the construction of the machine.

The main frame of the machine is composed of the bar or body A, forked at its rear end to provide bearings for the rear or driving wheel B at C. The forward end of this bar terminates in or is rigidly joined to a tubular piece D, which is at nearly right angles to the said bar and which is secured to the forward or upright part of the frame. This latter is composed of two side bars E, bent forward at their lower ends to form bearings for the front wheel F, and at the upper ends bent backward and outward to form the guiding or steering handles G. These bars are secured rigidly together by cross-braces H H. The tubular part D is mounted on ball-bearings on the lower cross-brace, and its upper end is afforded a bearing in a screw I, set in the upper brace and provided with a binding or lock nut J. By this means the forward portion of the frame carrying the front wheel may be readily turned to guide the machine. A passage is formed through the screw I, the tubular part D, and the bearing in the lower cross-brace for a brake-rod K, that carries a brake L at its lower end and that is connected with a lever or handle M at its upper end, which handle is pivoted to one of the bars E. A spring N, surrounding the brake-rod, serves to elevate the brake from contact with the tire of the front wheel, except when depressed by the handle.

The saddle O is carried by a curved bar P, that is secured to the shield or mud-guard Q over the driving-wheel. The lower end of the said bar P is bifurcated and embraces the bar A, and in the ends of the fork are journaled the cranks R, that carry the pedals.

On the pedal or crank shaft is the sprocket-wheel S, geared to the driving-wheel by chain T.

The mud-guard Q and bar P are supported upon the frame A by spring bars or rods V. The bars are set in or secured to the forks of the frame A and radiate from a point thereon coinciding nearly with the axis of the driving-wheel. These ends are secured to the guard in any preferred manner, as by being bent and inserted in sleeves U, attached to the under side of said guard, as shown in Fig. 4. It results from this arrangement and the fact that the saddle is slightly forward of the axis of the driving-wheel that the movement of the bar P, under the yielding of the spring-supporting bars, will be in a direction concentric with the driving-wheel, the fork at the lower end of said bar providing for sufficient movement or play between the two parts of the frame. The spring motion thus secured is much more desirable than that in a vertical direction, which results from the use of the ordinary springs, and the machine has little or no tendency to slow up or stop whenever it meets with a slight obstruction that causes the rider to jolt in the saddle.

What we claim is—

1. In a bicycle, the combination, with the main frame in which the wheels are mounted, of a rigid bar or frame carrying the saddle and pedal-shaft, and a series of spring bars or rods the ends of which are secured in plates on opposite sides of the driving or rear wheel, said rods radiating in an upward direction from a point at or near the axis of the said wheel and supporting the bar or frame, as set forth.

2. In a bicycle, the combination, with a mud guard or shield surrounding the upper portion of the rear or driving wheel and a series of spring-supporting rods therefor the ends of which are secured in plates on each side of the driving-wheel and radiating upward from the axis of said wheel, of a bar attached to said guard, a saddle mounted thereon forward of the axis of the driving-wheel, and a pedal or crank shaft carried by the said bar, as set forth.

3. The combination, with the horizontal frame or bar A, the handle-frame pivoted thereto, and the front and rear wheels mounted in the two parts, as described, of a curved bar P, carrying the saddle and the pedal or crank shaft and bifurcated to embrace the bar A, the spring-rods V, secured to the bar A on each side of the rear wheel and radiating upward from the axis of said wheel, the said rods being connected to the bar P and forming supports therefor, as set forth.

HENRY W. THURSTON.
ERIK STENERSEN.

Witnesses for Thurston:
W. H. OLANDT,
W. H. WEBSTER.

Witnesses for Stenersen:
HANSON E. ERICKSEN,
RUDOLPH STENERSEN.